Figure 1:
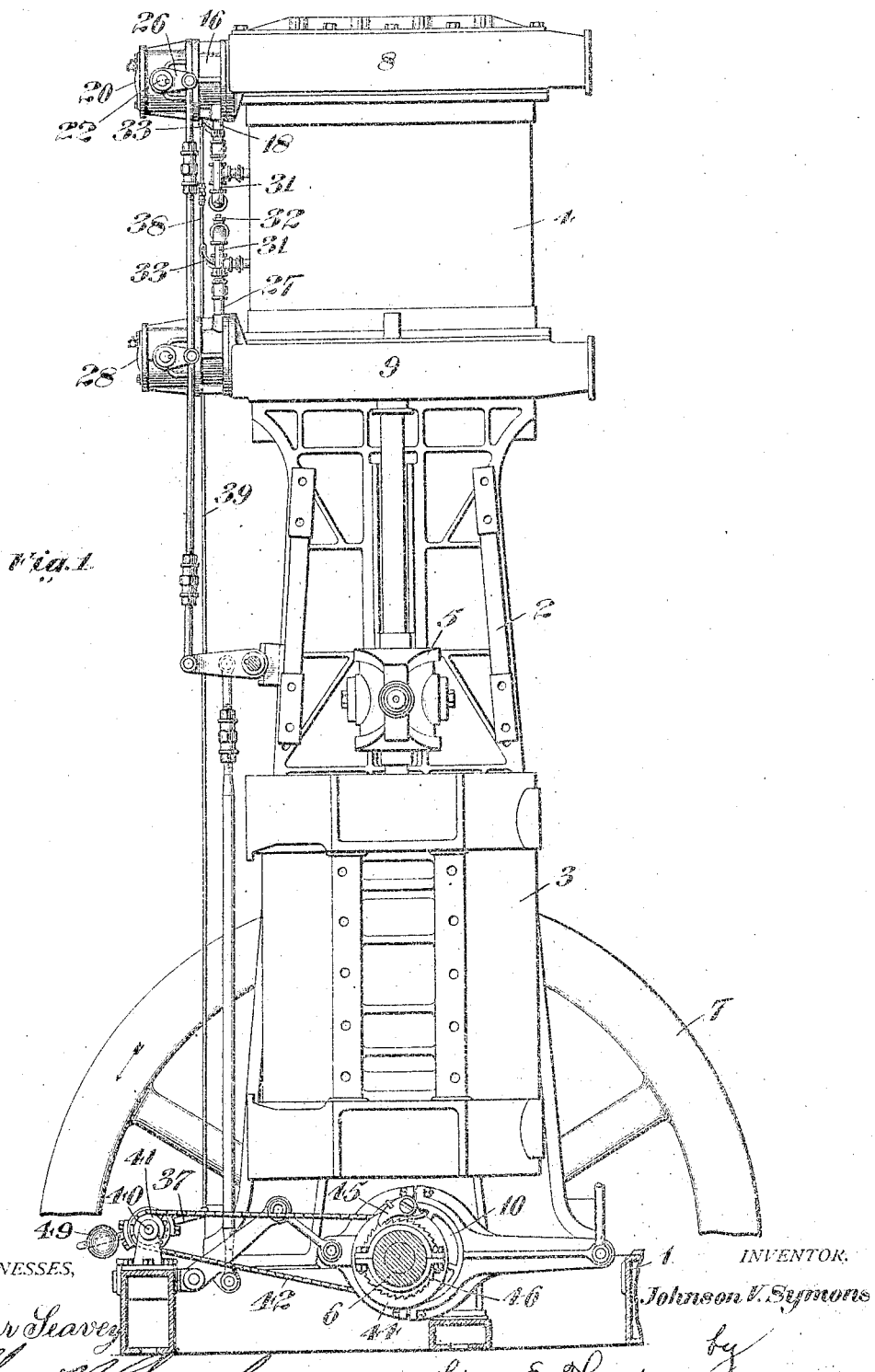

No. 813,064. PATENTED FEB. 20, 1906.
J. V. SYMONS.
CONTROLLING MECHANISM FOR BLOWING ENGINES.
APPLICATION FILED MAY 18, 1905.

4 SHEETS—SHEET 1.

WITNESSES,
Elmer Seaver
Chas. M. Chambers

INVENTOR.
Johnson V. Symons
by Geo. E. Thackray, his ATTORNEY.

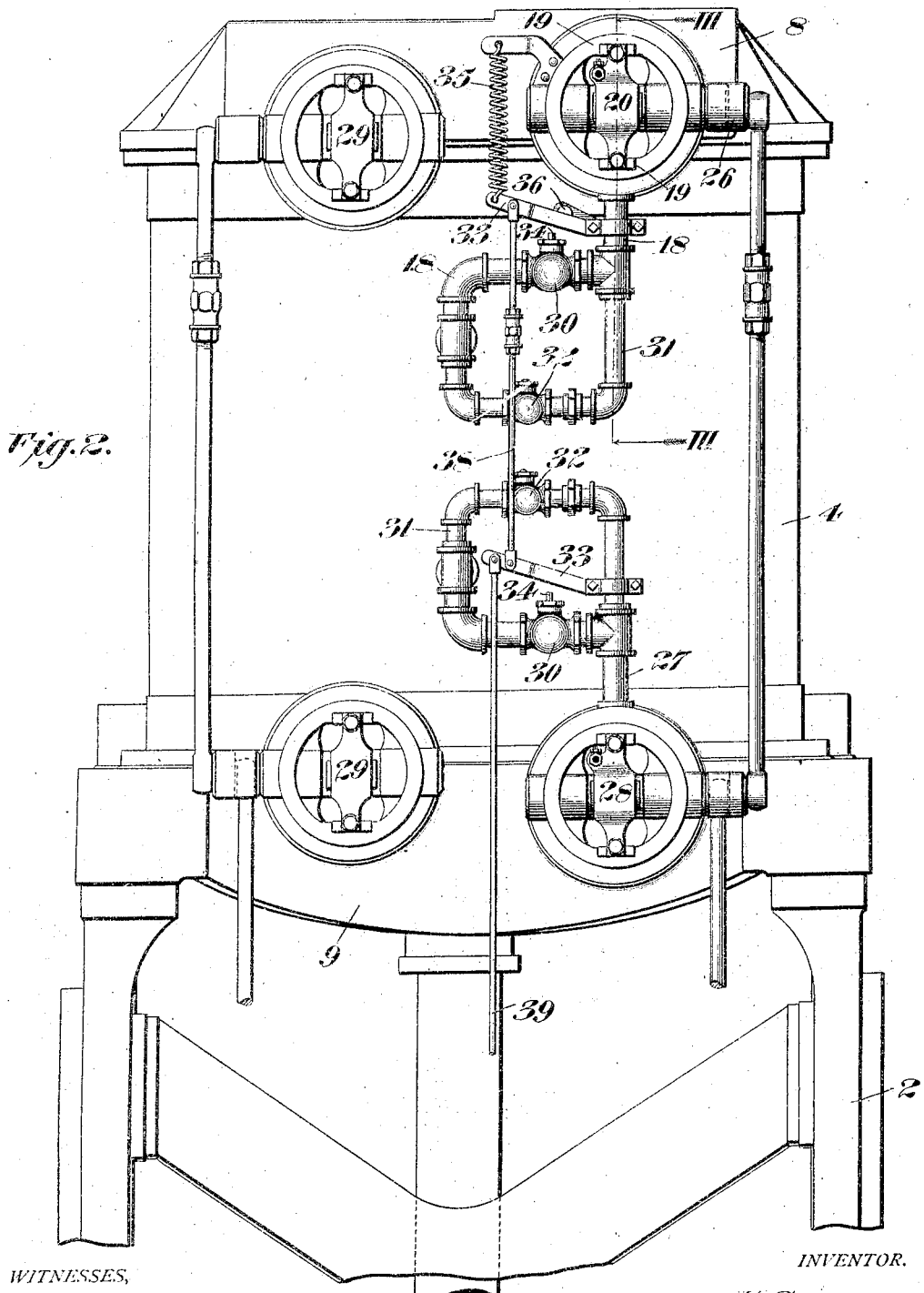

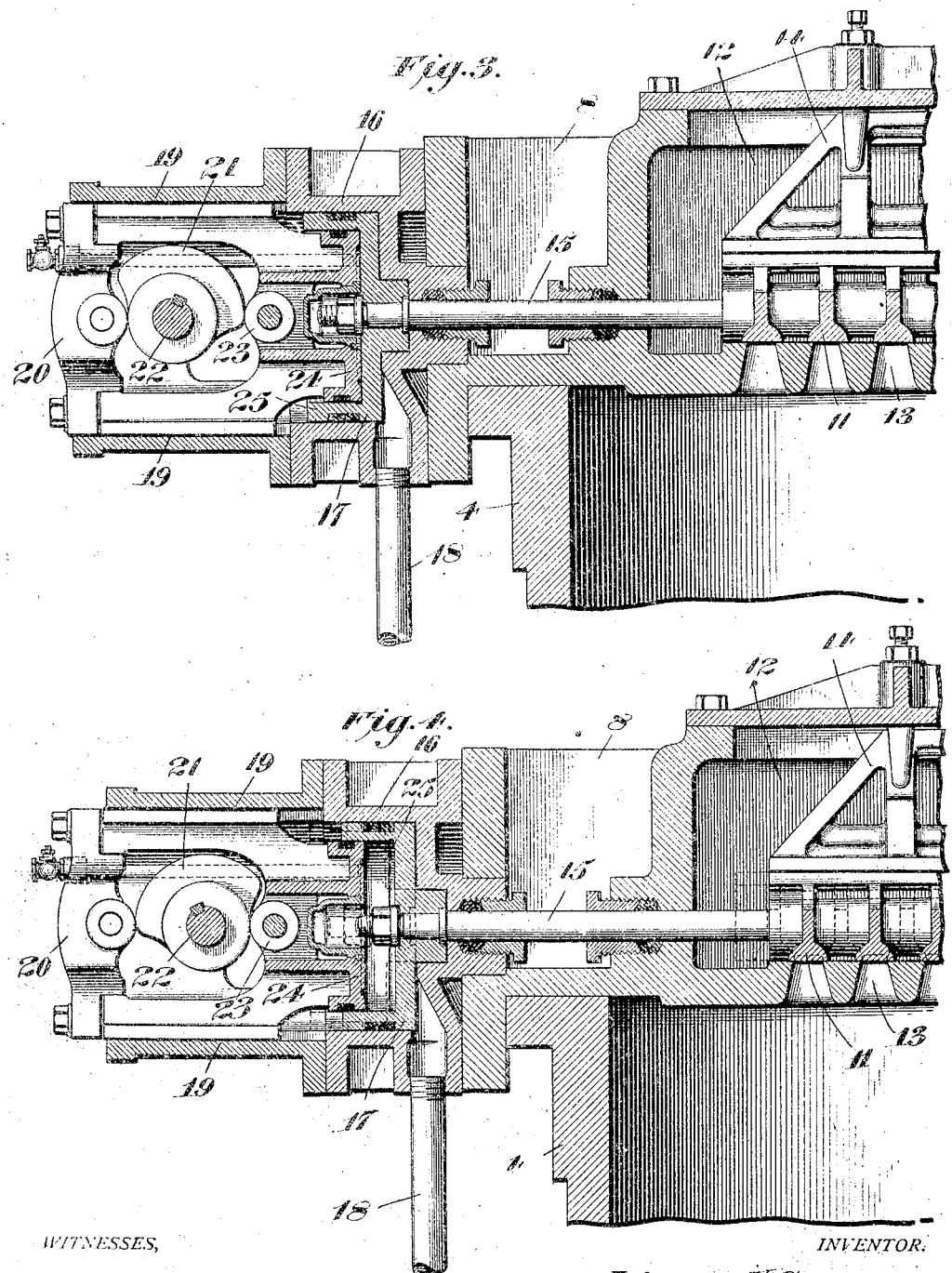

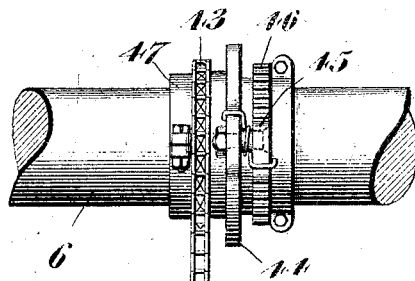
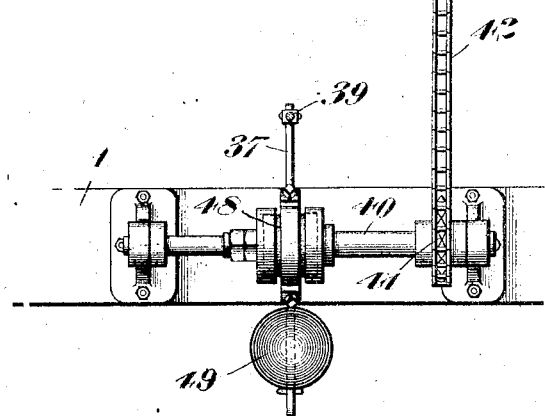
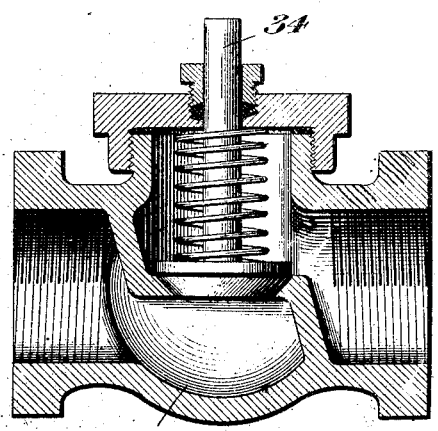

UNITED STATES PATENT OFFICE.

JOHNSON V. SYMONS, OF JOHNSTOWN, PENNSYLVANIA.

CONTROLLING MECHANISM FOR BLOWING-ENGINES.

No. 813,064.   Specification of Letters Patent.   Patented Feb. 20, 1906.

Application filed May 18, 1905. Serial No. 260,935.

*To all whom it may concern:*

Be it known that I, JOHNSON V. SYMONS, a citizen of the United States, residing at Johnstown, in the county of Cambria and State of Pennsylvania, have invented certain new and useful Improvements in Controlling Mechanism for Blowing-Engines; and I do hereby declare the following to be a full, clear, and exact description of the invention, such as will enable others skilled in the art to which it appertains to make and use the same.

My invention relates to blowing-engines, and more particularly to those having outlet-valves which are opened by air-pressure from the air-cylinders and are not closed or held closed by the pressure of the air from the blast-main. Its general object is to provide means for preventing the compressed air from driving such blowing-engines in a reverse direction to that of the normal cycle of their movement; and it has for its specific object to provide means for preventing the opening of the outlet-valves upon the movement of the engines in such reverse direction.

An objection to engines of the above-described type lies in the fact that it is possible for them to be driven backward by the pressure of the air after the motive force has been removed, at which time they are in danger of damaging or even wrecking themselves, having no resistance except that of their moving parts. Considerable difficulty is experienced in the operation of such engines in order to prevent accidents of this kind. My invention very effectively removes the above objection and difficulty by providing means for preventing the opening of the outlet-valves upon the retrograde movement of such engines, thereby preventing the admission of the compressed air from the blast-main into the air-cylinder, thus making such engines more safely and easily operated.

In the accompanying drawings an embodiment of my invention is shown applied to a vertical direct-connected blowing-engine of the above-described type.

Referring to the drawings forming a part hereof, in which like characters of reference designate like parts, Figure 1 is a fragmentary side elevation of as much of the blowing-engine as is necessary to show the application of my invention. Fig. 2 is a rear elevation, on an enlarged scale, of the air end of the blowing-engine, showing the connections between the outlet-valve-actuating cylinders and the air-cylinder and the means for controlling the flow of air in the same. Fig. 3 is a fragmentary sectional elevation, on a still larger scale, of the upper outlet-valve, taken on a plane indicated by line III III of Fig. 2, showing the parts in the position they assume at the time the valve is closed. Fig. 4 is a view corresponding to Fig. 3, showing in full lines the parts in the position they assume just before the valve is opened and in dotted lines after it is opened. Fig. 5 is a plan view of the operating mechanism for the controlling-valves made on the same scale as Fig. 2. Fig. 6 is a longitudinal sectional elevation of a controlling-valve made on a much-enlarged scale.

Referring to Fig. 1 of the drawings, 1 designates the bed of the engine; 2, one of the housings, the opposite one being omitted for the sake of clearness; 3, the steam-cylinder; 4, the air-cylinder; 5, the cross-head; 6, the main shaft, and 7 one of the fly-wheels, of which there are two. All of these parts may be of the usual or any desired construction and their function remain the same. Hence they will need no further description here. The valve-gear for the steam-cylinder and also the steam connections and blast-main have been omitted, since they form no part of the present invention. At the ends of the air-cylinder are the upper and lower air-heads 8 and 9, respectively, each of which is provided with an inlet and an outlet valve. These valves, as herein shown, are of the gridiron type and are adapted to be operated wholly or in part by the eccentric 10 on the main shaft, to which more specific reference will be made later. They are timed in their operation relative to the movement of the main shaft, and consequently the piston, in a way common to mechanically-operated valves, in which no novelty is claimed.

The upper outlet-valve 11 (shown in Figs. 3 and 4) is mounted in the usual manner in the air-chest 12, which forms a part of the air-head 8 and is held down upon its seat 13, upon which it slides, by the guides 14. Secured to the valve is the valve-stem 15, which projects through the wall of the air-chest and is provided with a suitable packing. To the outer face of the air-head and in alinement with the valve-stem is secured the actuating-cylinder 16, into which the valve-stem projects through a suitable packing therefor. The actuating-piston 17 is secured to the outer end of the valve-stem by any desired means and is mounted in the actuating-cylinder in the usual manner. A suitable passage-way, as the pipe 18, connects the actuating-cylinder with the air-cylinder 4 and opens into the latter at such a point that when the air therein reaches a certain pressure a portion of it may pass into the actuating-cylinder and serve to open the outlet-valve. This pressure is usually about equal to or slightly greater than that in the blast-main, so that the valve is partially or practically counterbalanced. Secured to the outer face of the actuating-cylinder is the cross-head guide 19, in suitable ways in which slides the cross-head 20. The cam 21 is secured to the shaft 22, mounted in bearings forming a part of the cross-head guide, and contacts with the rollers 23, carried by the cross-head. The inner end 24 of the cross-head is made as a piston and fits into the cylinder 25, formed in the actuating-piston 17, thus constituting a dash-pot, which serves to cushion the outlet-valve as it reaches the limit of its movement. The shaft 22 carries at its outer end the rocker-arm 26, which is connected with and receives its motion from the eccentric-strap of the eccentric 10 on the main shaft by means of suitable connecting-rods, rocker-arms, and levers. When the cam 21 is rocked from the position shown in Fig. 3, the cross-head 20 is moved away from the actuating-piston, as shown in Fig. 4, thus leaving the actuating-piston free to be moved by the air from the air-cylinder, as above described, to open the outlet-valve. At the completion of the stroke the cam 21 is rocked in the reverse direction, moving the cross-head, the actuating-piston, with which it contacts, and the outlet-valve to the closed position, as shown in Fig. 3.

The lower outlet-valve is substantially identical in construction with the upper one, except that it is adapted to be placed in an inverted position, and it is operated in precisely the same manner. It is opened at the proper time by air passing through the pipe 27 from the air-cylinder to the actuating-cylinder and is closed by the cross-head 28, operated by the eccentric 10 through the intermediacy of suitable connections.

The inlet-valves (not shown) are made substantially like the corresponding outlet-valves, except that they are larger. They are connected directly with the cross-heads 29, respectively, which are similar to and are operated in the same manner as cross-heads 20 and 28. By these means the inlet-valves are both opened and closed by mechanical means.

As it is customary to have a large amount of air under pressure in the blast-mains and as several engines are ordinarily discharging air into the same main, it will readily be seen in view of the foregoing description that any of the engines may be driven backward by the air under pressure in the blast-main when the steam is shut off said engine or the motive force removed by one cause or another, for the engine would not come to a standstill with both outlet-valves entirely closed except possibly in rare instances. When it is desired to shut the engine down, the steam must be shut off and the blast-valve closed simultaneously, which of course requires at least two men and considerable time and careful attention. By "blast-valve" I mean the customary valve located in the blast-pipe which conducts air under pressure from the blowing-engine to the larger pipe or blast-main, into which latter several engines may be discharging air for any use to which air-blast may be put. If one man undertakes to shut the engine down, he must first shut off the steam and then close the blast-valve, during the interval between which operations the engine will have attained a dangerous speed in a reverse direction, since there is no resistance except its own friction. In case an accident happens such that the motive force is removed without the engineer's knowledge, the engine will probably have attained such a speed in a reverse direction by the time it is noticed that no one would dare attempt to close the blast-valve. The further damaging or wrecking of the engine would consequently result. These conditions obtain especially where such engines are connected to the same blast-main, for then the pressure in the blast-main would be maintained indefinitely after the steam has been shut off from one or more engines, while others remained in operation. To prevent such a circumstance, the blast-mains have often been provided with check-valves or valves operating in a similar manner. Outlet-valves adapted to be closed and held closed by the pressure of air in the main have also been used. All of such valves, however, are impracticable in blowing-engines of very large size in consequence of their enormous dimensions and rapid deterioration. I accomplish the desired result in a very efficient manner by providing means for preventing the opening of the outlet-valves upon the retrograde movement of the engine. In the present embodiment of my invention I provide means for shutting off the passage-ways leading from the air-cylinder to the actuating-cylinders at such a time. The pipes 18 and 27 are each furnished with controlling-valves 30, which are so located and arranged that the air is permitted to pass from the air-cylinder to the actuating-cylinders when the engine is running forward, but not when it is running in the reverse direction. A by-pass 31, having a check-valve 32, is connected with each of these pipes on each side of controlling-valves 30, which permits the air caught in the actuating-cylinders to escape back into the air-cylinder when the valves are closed. From the above it will be readily seen that if the controlling-valve 30 be closed no air can enter the actuating-cylinder, and hence the outlet-valves will not be opened when once closed. Any desired means may be provided for closing these controlling-valves when the engine would otherwise run backward without departing from the spirit of my invention. An efficient means is herein shown which consists simply of a clutch-operated mechanism connected with the main shaft. Levers 33 are suitably mounted, preferably upon the engine, and are adapted to contact, respectively, with valve-stems 34, with which valves 30 are provided. A spring 35 serves to hold these levers out of contact with the valve-stems and a stop 36 to limit their upward movement. These levers are connected with a rocker-arm 37 preferably by linking them together by the rod 38 and the lower one with the rocker-arm by the rod 39. The rocker-arm 37 is mounted upon the rock-shaft 40, which is journaled in suitable bearings secured to the engine-bed or elsewhere. Secured to the rock-shaft 40 is a sprocket-wheel 41, which is connected, by means of a link-belt 42, with a corresponding sprocket-wheel 43, loosely mounted upon the main shaft 6 of the engine. Integral with the sprocket-wheel 43 is a disk 44, which carries one or more spring-pressed pawls 45, which are adapted to engage a ratchet-wheel 46, secured to the main shaft. A collar 47 serves to hold the pawl and ratchet in their proper relation to each other. These parts are so assembled that the pawl clicks idly over the ratchets when the engine is running forward, but immediately engages therewith when it runs backward. To compensate for a greater movement on the part of the rock-shaft 40 than is permitted to the rocker-arm 37, a friction-clutch 48 is preferably provided between the two. The weight 49 serves to assist the spring 35 to counterbalance the parts and to return them to their normal position as soon as the engine runs forward again.

By the means above described the controlling-valves 30 are immediately closed at the initial retrograde movement of the engine. These valves being closed, no air can enter the actuating-cylinder after they have once been closed. Hence the engine cannot be driven backward by the air under pressure in the blast-main more than a single stroke of the piston or a half-revolution of the main shaft. One man may easily and safely stop the engine, and there is no danger of its being damaged or wrecked in case an accident happens to the steam end, which would remove the motive force.

It will readily be seen that a variety of means may be provided for closing the controlling-valves upon the retrograde movement of the engine. Hence it is not the desire to limit this application to the precise means herein shown and described, but to have it construed as broadly as the invention merits.

Having thus described my invention, what I claim, and desire to secure by Letters Patent, is—

1. A blowing-engine having an air-cylinder, a valve therefor, and means, actuated by the retrograde movement of the engine for preventing the opening of said valve.

2. In a blowing-engine, the combination with the air-cylinder, of an outlet-valve therefor, actuating means for said valve and means operated by the engine for rendering said actuating means inoperative upon the retrograde movement of the engine.

3. In a blowing-engine, the combination with the air-cylinder, of an outlet-valve therefor, actuating means for said valve adapted to be operated by air-pressure and means for cutting off the supply of air from said actuating means when the engine is driven in a reverse direction to that of its normal movement.

4. In a blowing-engine, the combination with the air-cylinder, of outlet-valves therefor, actuating means for said valves adapted to be operated by air-pressure from the cylinder, and means for cutting off the supply of air for said actuating means when the engine is driven in a reverse direction to that of its normal movement.

5. In a blowing-engine, the combination with the air-cylinder, of an outlet-valve therefor, an actuating-cylinder for said valve, a passage-way connecting said actuating-cylinder with the air-cylinder, a controlling-valve in said passage-way and means for closing said controlling-valve when the engine is driven backward.

6. In a blowing-engine, the combination with the air-cylinder and the main shaft, of an outlet-valve for the air-cylinder, an actuating-cylinder for said valve, a controlling-valve for said actuating-cylinder and means connected with the main shaft adapted to close said controlling-valve when the engine is driven backward.

7. In a blowing-engine, the combination with the air-cylinder and the main shaft of an outlet-valve for the air-cylinder, an actuating-cylinder for said valve, a controlling-valve for said actuating-cylinder, a clutch on the main shaft and means connected with said clutch to close said controlling-valve when the engine is driven backward.

8. In a blowing-engine, the combination with the air-cylinder and the main shaft, of an outlet-valve for the air-cylinder, an actuating-cylinder for said valve, a controlling-valve for said actuating-cylinder, a ratchet-clutch on the main shaft operative only when the engine is run backward, a rocker-arm connected with said clutch and with said controlling-valve and a friction-clutch interposed between said rocker-arm and said ratchet-clutch.

9. In a blowing-engine, the combination with the air-cylinder and the main shaft, of an outlet-valve for the air-cylinder, an actuating-cylinder for said valve, a passage-way connecting said actuating-cylinder with the air-cylinder, a controlling-valve in said passage-way, a by-pass for said controlling-valve, a check-valve in said by-pass, a lever for closing said controlling-valve; a ratchet-clutch on the main shaft operative only when the engine is run backward, a rock-shaft connected with said clutch, a rocker-arm on said rock-shaft, a friction-clutch interposed between said rocker-arm and said rock-shaft, a connection between said rocker-arm and said lever and means for returning said lever and its operating mechanism to their normal position when inoperative.

In testimony whereof I hereto affix my signature in the presence of two witnesses.

JOHNSON V. SYMONS.

Witnesses:
ELMER SEAVEY,
CHAS. N. CHAMBERS.